United States Patent
Kanoh et al.

(10) Patent No.: US 11,449,060 B2
(45) Date of Patent: Sep. 20, 2022

(54) VEHICLE, APPARATUS FOR CONTROLLING SAME, AND CONTROL METHOD THEREFOR

(71) Applicant: HONDA MOTOR CO., LTD., Tokyo (JP)

(72) Inventors: Tadahiko Kanoh, Wako (JP); Hiroaki Horii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 156 days.

(21) Appl. No.: 16/826,592

(22) Filed: Mar. 23, 2020

(65) Prior Publication Data
US 2020/0218269 A1    Jul. 9, 2020

Related U.S. Application Data

(63) Continuation of application No. PCT/JP2017/037025, filed on Oct. 12, 2017.

(51) Int. Cl.
*G05D 1/02* (2020.01)
*B60W 60/00* (2020.01)
*B60W 40/04* (2006.01)

(52) U.S. Cl.
CPC .......... *G05D 1/0214* (2013.01); *B60W 40/04* (2013.01); *B60W 60/0027* (2020.02); *G05D 2201/0212* (2013.01); *G05D 2201/0213* (2013.01)

(58) Field of Classification Search
CPC ......... G05D 1/0214; G05D 2201/0212; G05D 2201/0213; B60W 40/04; B60W 60/0027;
(Continued)

(56) References Cited

U.S. PATENT DOCUMENTS

| 8,930,060 B1 | 1/2015 | Lu et al. |
| 8,977,435 B2 | 3/2015 | Kobana et al. |

(Continued)

FOREIGN PATENT DOCUMENTS

| DE | 102010030486 A1 | 12/2011 |
| DE | 102015226232 A1 | 6/2017 |

(Continued)

OTHER PUBLICATIONS

International Search Report for PCT/JP2017/037025 dated Jan. 16, 2018.

(Continued)

*Primary Examiner* — Rodney A Butler
(74) *Attorney, Agent, or Firm* — Thomas | Horstemeyer, LLP

(57) ABSTRACT

A control apparatus for performing travel control of a vehicle comprises a sensor configured to detect a state around the vehicle, and a travel controller configured to perform travel control for automated driving based on a detection result of the sensor. The travel controller is configured to, in a case where a predetermined condition is satisfied, select a target stop position located in a latitudinal direction with respect to a direction in which the vehicle moves, according to selection criteria, and to stop the vehicle at the target stop position. The selection criteria include a comparison between a speed of the vehicle and a threshold speed.

15 Claims, 5 Drawing Sheets

(58) Field of Classification Search
CPC ......... B60W 2520/10; B60W 2554/80; B60W 60/0053; B60W 50/14; B60W 60/001; B60Y 2302/05; B60K 28/066; B60K 28/10; B60T 7/12; B60T 7/14
See application file for complete search history.

(56) References Cited

U.S. PATENT DOCUMENTS

| | | | |
|---|---|---|---|
| 9,523,984 B1 | 12/2016 | Herbach et al. | |
| 9,707,966 B2 | 7/2017 | Herbach et al. | |
| 9,821,807 B2 | 11/2017 | Herbach et al. | |
| 9,932,038 B1* | 4/2018 | Zhu | B60W 40/105 |
| 10,981,566 B2 | 4/2021 | Pitale et al. | |
| 2013/0085636 A1* | 4/2013 | You | B62D 15/027 |
| | | | 701/25 |
| 2013/0311043 A1 | 11/2013 | Kobana et al. | |
| 2014/0121927 A1* | 5/2014 | Hanita | B60T 7/14 |
| | | | 701/70 |
| 2015/0019063 A1 | 1/2015 | Lu et al. | |
| 2016/0231746 A1* | 8/2016 | Hazelton | G01S 13/867 |
| 2017/0057510 A1 | 3/2017 | Herbach et al. | |
| 2017/0274901 A1 | 9/2017 | Herbach et al. | |
| 2018/0165962 A1* | 6/2018 | Neystadt | G08G 1/165 |
| 2018/0178766 A1* | 6/2018 | Oba | G05D 1/0061 |
| 2018/0297593 A1 | 10/2018 | Pitale et al. | |

FOREIGN PATENT DOCUMENTS

| | | |
|---|---|---|
| GB | 2481535 A1 | 12/2011 |
| JP | 2007-331652 A | 12/2007 |
| JP | 2008-260337 A | 10/2008 |
| JP | 5282143 B2 | 9/2013 |
| JP | 2014-154128 A | 8/2014 |
| WO | 2012/105030 A1 | 8/2012 |
| WO | 2017/002471 A1 | 1/2017 |
| WO | 2019/073578 A1 | 4/2019 |

OTHER PUBLICATIONS

German Office Action for German Patent Application No. 112017007926.8 dated Jul. 15, 2021 (partially translated).

* cited by examiner

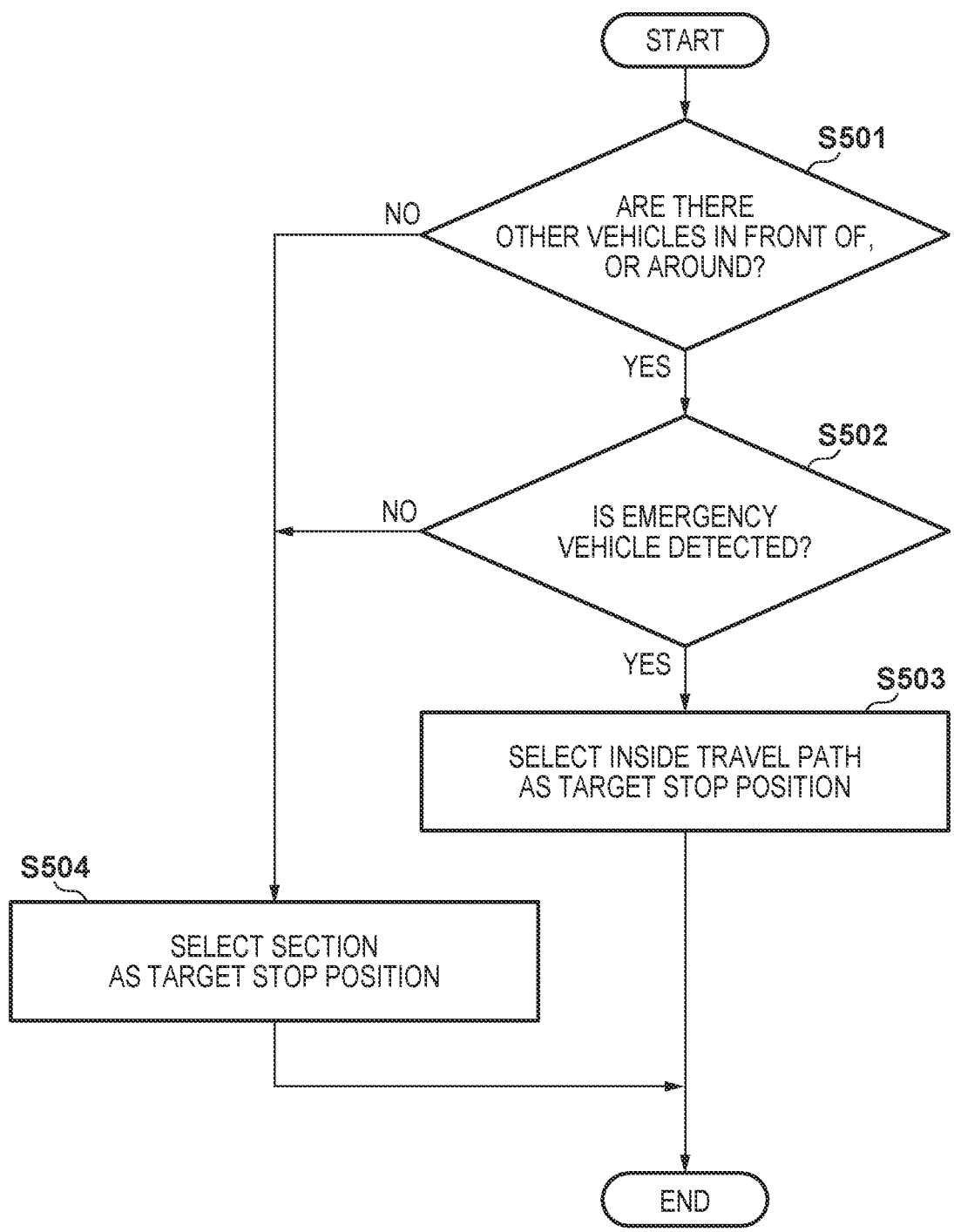

VEHICLE, APPARATUS FOR CONTROLLING SAME, AND CONTROL METHOD THEREFOR

CROSS-REFERENCE TO RELATED APPLICATION(S)

This application is a continuation of International Patent Application No. PCT/JP2017/037025 filed on Oct. 12, 2017, the entire disclosure of which is incorporated herein by reference.

BACKGROUND OF THE INVENTION

Field of the Invention

The present invention relates to a vehicle, an apparatus for controlling the same, and a control method therefor.

Description of the Related Art

Japanese Patent Laid-Open No. 2007-331652 discloses a vehicle stopping apparatus that forcibly stops a vehicle in a case where a driver's consciousness decreases and the driver cannot drive normally. This vehicle stopping apparatus controls a vehicle using, as a target stop position, a position at which the width of a road shoulder is the largest. This reduces the influence on the traveling of other vehicles. It is not always the best to stop a vehicle at a position at which the width of a road shoulder is the largest as in Japanese Patent Laid-Open No, 2007-331652.

SUMMARY OF THE INVENTION

Some aspects of the present invention provide a technique for stoppoing a vehicle at an appropriate position. According to some embodiments, provided is a control apparatus for performing travel control of a vehicle, the control apparatus including: a sensor configured to detect a state around the vehicle; and a travel controller configured to perform travel control for automated driving based on a detection result of the sensor, in which the travel controller is configured to, in a case where a predetermined condition is satisfied, select a target stop position located in a latitudinal direction with respect to a direction in which the vehicle moves, according to selection criteria, and to stop the vehicle at the target stop position, and the selection criteria include at least one of a comparison between a speed of the vehicle and a threshold speed, and/or the presence of a surrounding vehicle of the vehicle, or a positional relationship between the vehicle and a surrounding vehicle of the vehicle.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings are included in, and constitute a part of, the specification, illustrate embodiments of the present invention, and are used together with the description thereof to explain the principle of the invention.

FIG. 5 is a flowchart for realizing an example of processing executed by a control apparatus of an embodiment.

DESCRIPTION OF THE EMBODIMENTS

Figure 1:
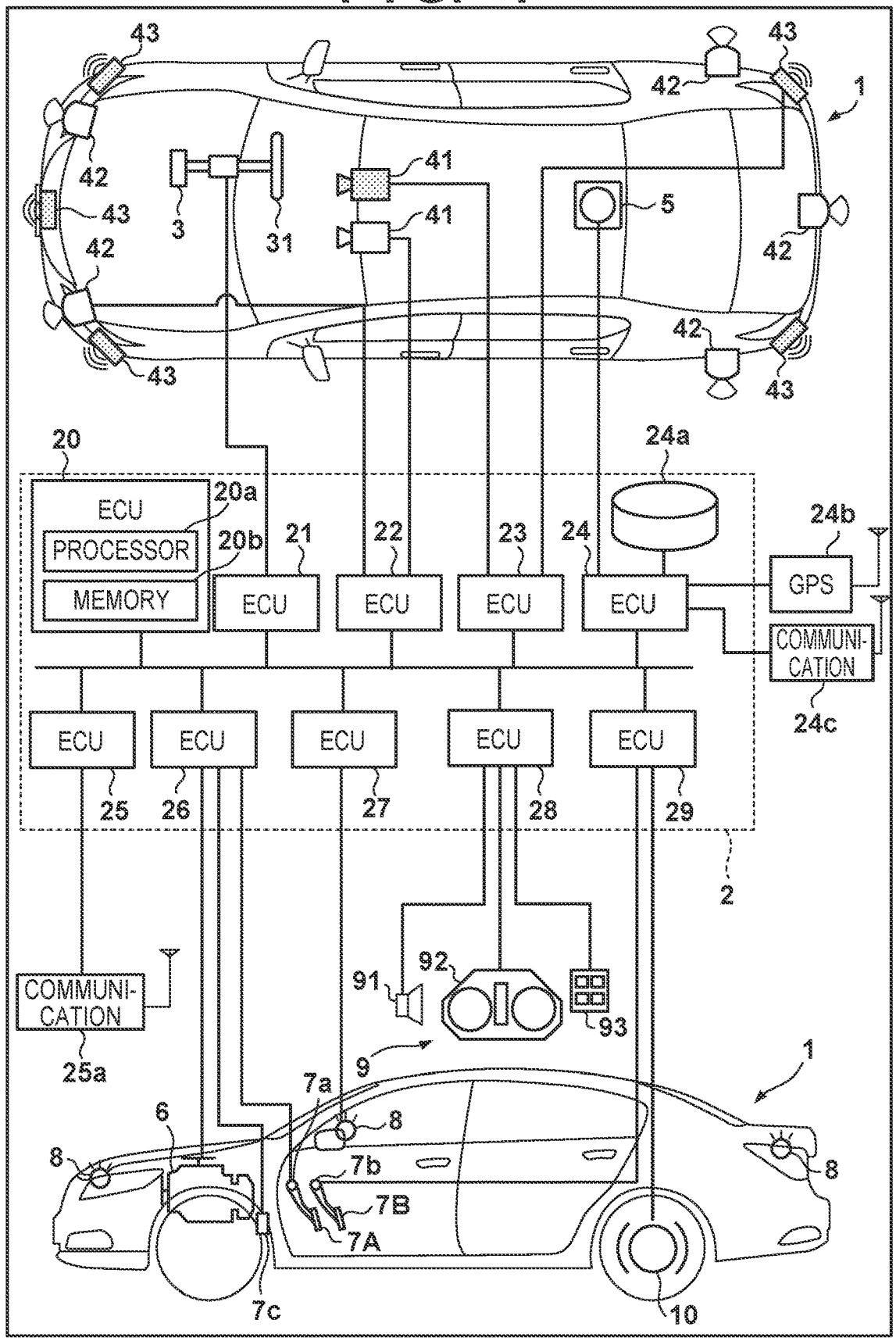
FIG. 1 is a block diagram of a vehicle according to an embodiment.

Embodiments of the present invention will be described below with reference to the accompanying drawings. The same elements are given the same reference numerals in various embodiments, and a redundant description is omitted. Also, embodiments may be modified and combined as appropriate.

FIG. 1 is a block diagram of a control apparatus for a vehicle according to one embodiment of the present invention, and the control apparatus controls a vehicle 1. The overview of the vehicle 1 is shown in FIG. 1 with use of a plan view and a side view. The vehicle 1 is a sedan-type four-wheel passenger vehicle, as one example.

The control apparatus shown in FIG. 1 includes a control unit 2. The control unit 2 includes a plurality of ECUs 20 to 29 that are communicably connected to each other through an in-vehicle network. The ECUs each include a processor represented by a CPU, a memory such as a semiconductor memory, an interface with an external device, and the like. Programs executed by the processor, data used by the processor in processing, and the like are stored in the memory. The ECUs may also each include multiple processors, memories, interfaces, and the like. An ECU 20 includes a processor 20a and a memory 20b, for example. As a result of the processor 20a executing a command that is included in a program stored in the memory 20b, processing is executed by the ECU 20. Instead of this, the ECU 20 may include a dedicated integrated circuit for executing processing performed by the ECU 20, such as an ASIC.

Hereinafter, functions and the like of the ECUs 20 to 29 will be described. Note that the number of ECUs and their functions can be designed as appropriate, and the functions and the like may be divided or integrated more than in this embodiment.

The ECU 20 executes control related to automated driving of the vehicle 1. In automated driving, at least one of steering of the vehicle 1 and/or acceleration/deceleration is automatically controlled. In an example of control, which will be described later, both steering and acceleration/deceleration are automatically controlled.

The ECU 21 controls an electric power steering apparatus 3. The electric power steering apparatus 3 includes a mechanism for steering the front wheels according to a driving operation (steering operation) performed by a driver on a steering wheel 31. Also, the electric power steering apparatus 3 includes a motor that exerts a driving force for assisting a steering operation and automatically steering the front wheels, a sensor that detects a steering angle, and the like. If the driving state of the vehicle 1 is automated driving, the ECU 21 automatically controls the electric power steering apparatus 3 according to an instruction issued by the ECU 20, and controls the direction in which the vehicle 1 moves.

The ECUs 22 and 23 control detection units 41 to 43 are configured to detect the state of the surrounding region of the vehicle and perform information processing on detection results. The detection units 41 are cameras configured to capture images of the forward of the vehicle 1 (referred to as a "camera 41" in some cases hereinafter), and in this embodiment, two detection units 41 are provided in a front portion of the roof of the vehicle 1. A contour of a target and lane markers (white lines and the like) of lanes on a road can be extracted by analyzing the images captured by the cameras 41.

The detection units 42 are LIDARs (Light Detection and Ranging) (referred to as a "LIDAR 42" in some cases hereinafter), and detect a target in the surrounding region of the vehicle 1 and measure the distance to a target, for example. In this embodiment, five LIDARs 42 are provided, and each corner portion of a front portion of the vehicle 1 is provided with one LIDAR 42, the center of a rear portion is provided with one LIDAR 42, and each side of the rear portion is provided with one LIDAR 42. The detection units 43 are millimeter wave radars (referred to as a "radar 43" in some cases hereinafter), and detect a target in the surrounding region of the vehicle 1 and measure the distance to a target, for example. In this embodiment, five radars 43 are provided, and the center of the front portion of the vehicle 1 is provided with one radar 43, each corner portion of the front portion is provided with one radar 43, and each corner portion of the rear portion is provided with one radar 43.

The ECU 22 controls one of the cameras 41 and the LIDARs 42, and performs information processing on detection results. The ECU 23 controls the other camera 41 and the radars 43, and performs information processing on detection results. By providing two sets of apparatuses configured to detect the state of the surrounding region of the vehicle, it is possible to improve the reliability of the detection results, and by providing different types of detection units such as cameras, LIDARs, and radars, it is possible to analyze the surrounding environment of the vehicle in various ways.

The ECU 24 controls a gyro sensor 5, a GPS sensor 24b, and a communication apparatus 24c, and performs information processing on detection results or communication results. The gyro sensor 5 detects rotational motion of the vehicle 1. It is possible to determine a route of the vehicle 1 with use of the detection results of the gyro sensor 5, wheel speed, and the like. The GPS sensor 24b detects the current position of the vehicle 1. The communication apparatus 24c performs wireless communication with a server that provides map information and traffic information, and acquires these pieces of information. The ECU 24 can access a database 24a for map information constructed in a memory, and the ECU 24 searches for a route from the current position to a destination, for example. The ECU 24, the map database 24a, and the GPS sensor 24b constitute a so-called navigation apparatus.

The ECU 25 includes a communication apparatus 25a for inter-vehicle communication. The communication apparatus 25a performs wireless communication with other vehicles in the vicinity thereof, and exchanges information between vehicles.

The ECU 26 controls a power plant 6. The power plant 6 is a mechanism for outputting a driving force for rotating driving wheels of the vehicle 1, and includes an engine and a transmission, for example. The ECU 26 controls the output of the engine according to a driving operation (an accelerator operation or an acceleration operation) that is performed by a driver and detected by an operation detection sensor 7a provided in an accelerator pedal 7A, and changes the gear ratio of the transmission based on information such as the vehicle speed detected by a vehicle speed sensor 7c, for example. If the driving state of the vehicle 1 is automated driving, the ECU 26 automatically controls the power plant 6 according to an instruction issued by the ECU 20, and controls the acceleration/deceleration of the vehicle 1.

The ECU 27 controls lighting devices (head lights, tail lights, and the like) including direction indicators 8 (turn signals). In the example shown in FIG. 1, the direction indicators 8 are provided in the front portion, door mirrors, and the rear portion of the vehicle 1.

The ECU 28 controls an input/output apparatus 9. The input/output apparatus 9 outputs information to the driver, and accepts information input by the driver. A sound output apparatus 91 notifies the driver of information with use of sound. A display apparatus 92 notifies the driver of information by displaying an image. The display apparatus 92 is disposed on the surface of a driver seat, for example, and constitutes an instrument panel or the like. Note that the driver is notified using sound or a display as an example herein, but may be notified using vibrations or light. Also, the driver may be notified of information by combining two or more of sound, a display, vibrations, and light. Also, the combination thereof may be changed or the manner of a notification may be changed according to a level (a degree of urgency, for example) of information that the driver is to be notified of. An input apparatus 93 is a switch group that is disposed at a position at which the driver can operate the input apparatus 93 and issues an instruction to the vehicle 1, and may also include a sound input apparatus.

The ECU 29 controls a brake apparatus 10 and a parking brake (not shown). The brake apparatus 10 is a disk brake apparatus, for example, and is provided in each wheel of the vehicle 1, and decelerates or stops the vehicle 1 by applying resistance to rotation of the wheels. The ECU 29 controls operations of the brake apparatus 10 according to a driving operation (brake operation) of the driver that was detected by an operation detection sensor 7b provided in a brake pedal 7B, for example. If the driving state of the vehicle 1 is automated driving, the ECU 29 automatically controls the brake apparatus 10 according to an instruction issued by the ECU 20, and controls decelerating and stopping of the vehicle 1. The brake apparatus 10 and the parking brake may also be activated in order to keep the vehicle 1 stopped. Also, if the transmission of the power plant 6 includes a parking lock mechanism, the parking lock mechanism may also be activated in order to keep the vehicle 1 stopped.

Example of Control

Figure 2:
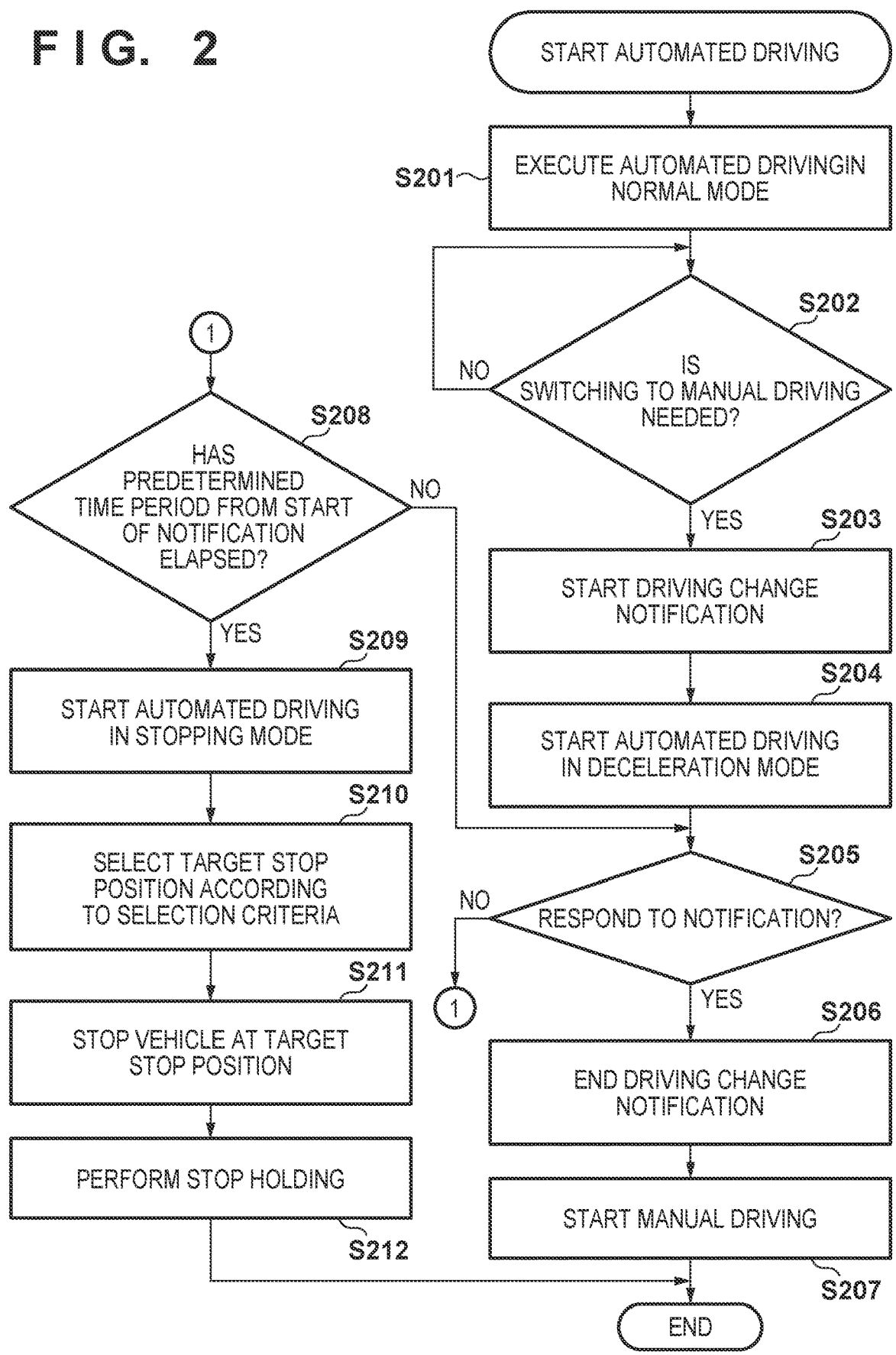
FIG. 2 is a flowchart for realizing an example of processing executed by a control apparatus of an embodiment.

An example of control of the vehicle 1 by the ECU 20 will be described with reference to FIG. 2. The flowchart shown in FIG. 2 is started in a case where the driver of the vehicle 1 issues an instruction for starting automated driving, for example. The ECU 20 functions as an apparatus for controlling the vehicle 1. Specifically, the ECU 20 functions as a travel controller that performs travel control for automated driving based on detection results of sensors that detect the state of the surrounding region of the vehicle 1 (e.g., the detection units 41 to 43, a wheel speed sensor, a yaw rate sensor, a G sensor, and the like).

In step S201, the ECU 20 executes automated driving in a normal mode. The normal mode refers to a mode in which steering, driving, and braking are all executed as needed to reach the destination.

In step S202, the ECU 20 determines whether switching to manual driving is needed. In a case where switching is needed ("YES" in step S202), the ECU 20 advances processing to step S203, and in a case where switching is not needed ("NO" in step S202), the ECU 20 repeats step S202. The ECU 20 determines that switching to manual driving is needed, in cases where predetermined conditions are satisfied, the cases including a case where it is determined that the function of a portion of the vehicle 1 deteriorates, a case where it is difficult to continue automated driving due to a change in the surrounding traffic state, and a case where the vehicle 1 has reached near the destination set by the driver, for example.

In step S203, the ECU 20 starts issuing a driving change notification. The driving change notification refers to a notification for making, to the driver, a request for switching to manual driving. Operations of the subsequent steps S204, S205, and S208 to S212 are performed while the driving change notification being issued.

In step S204, the ECU 20 starts automated driving in a deceleration mode. The deceleration mode refers to a mode in which steering and braking are executed as needed and a response of the driver to the driving change notification is waited for. In the deceleration mode, the vehicle 1 may be naturally decelerated with use of an engine brake or a regenerative brake, or braking may be performed utilizing a braking actuator (e.g., a friction brake). Also, the ECU 20 may increase the strength of a deceleration regeneration (e.g., by increasing the amount of regeneration), or may increase the strength of the engine brake (e.g., by reducing the gear ratio to a low ratio) even in the case of natural deceleration.

In step S205, the ECU 20 determines whether the driver has made a response to the driving change notification. In a case where the driver has made a response ("YES" in step S205), the ECU 20 advances processing to step S206, and in a case where the driver has not made a response ("NO" in step S205), the ECU 20 advances processing to step S208. The driver can make an indication for changing to manual driving with use of the input apparatus 93, for example. Instead of this, the driver may make an indication of their intention with use of steering detected by a steering torque sensor, holding of the steering wheel 31 detected by a holding sensor, the line-of-sight direction of the driver detected by a driver monitor camera, for example.

In step S206, the ECU 20 stops issuing the driving change notification. In step S207, the ECU 20 ends automated driving in the deceleration mode that is being executed, and starts manual driving. In manual driving, the ECUs of the vehicle 1 each control traveling of the vehicle 1 according to a driving operation of the driver. There is a possibility that performance or the like of the ECU 20 will decrease, and thus the ECU 28 may output, on the display apparatus 92, a message or the like for promoting to bring the vehicle 1 to a maintenance shop.

In step S208, the ECU 20 determines whether a predetermined time (e.g., a time according to automated driving levels of the vehicle 1, such as 4 seconds or 15 seconds) has passed from when issuing of the driving change notification is started. In a case where the predetermined time has passed ("YES" in step S208), the ECU 20 advances processing to step S209, and in a case where the predetermined time has not passed ("NO" in step S208), the ECU 20 returns processing to step S205, and repeats the processing from step S205 onward.

In step S209, the ECU 20 ends automated driving in the deceleration mode that is being executed and starts automated driving in a stopping mode. The stopping mode refers to a mode for stopping the vehicle 1 at a safety position or decelerating the vehicle 1 to a speed that is lower than a deceleration end speed in the deceleration mode. Specifically, the ECU 20 searches for a position at which the vehicle 1 can be stopped, while actively decelerating the vehicle 1 to a speed that is lower than the deceleration end speed in the deceleration mode. In a case where the ECU 20 found a stoppable position, the ECU 20 stops the vehicle 1 at this position, and in a case where the ECU 20 cannot find a stoppable position, the ECU 20 searches for a stoppable position while running the vehicle 1 at an excessively low speed (e.g., a creep speed). Operations of the subsequent steps S210 to S212 are performed while the stopping mode is being executed.

In step S210, the ECU 20 selects a target stop position according to selection criteria. The target stop position refers to a position serving as a target for stopping the vehicle 1. The selection criteria will be described later. In step S211, the ECU 20 stops the vehicle 1 at the selected target stop position.

In step S212, the ECU 20 determines to stop the vehicle 1 from the detection results of the wheel rotation speed sensors, and if it is determined that the vehicle has stopped, the ECU 20 instructs the ECU 29 to activate the electric parking lock apparatus, and performs stop holding control for keeping the vehicle 1 stopped. In a case where automated driving is performed in the stopping mode, a notification indicating that stopping is being performed may be issued to other vehicles in the vicinity thereof with use of a hazard lamp or another display apparatus, or other vehicles or other terminal devices may be notified thereof with use of a communication apparatus. The ECU 20 may perform deceleration control according to the presence or absence of other vehicles following behind the vehicle 1 while automated driving is executed in the stopping mode. The ECU 20 may make the degree of deceleration for the case where there are no vehicles following behind the vehicle 1 stronger than the degree of deceleration for the case where there is a vehicle following behind the vehicle 1, for example.

Figure 3:
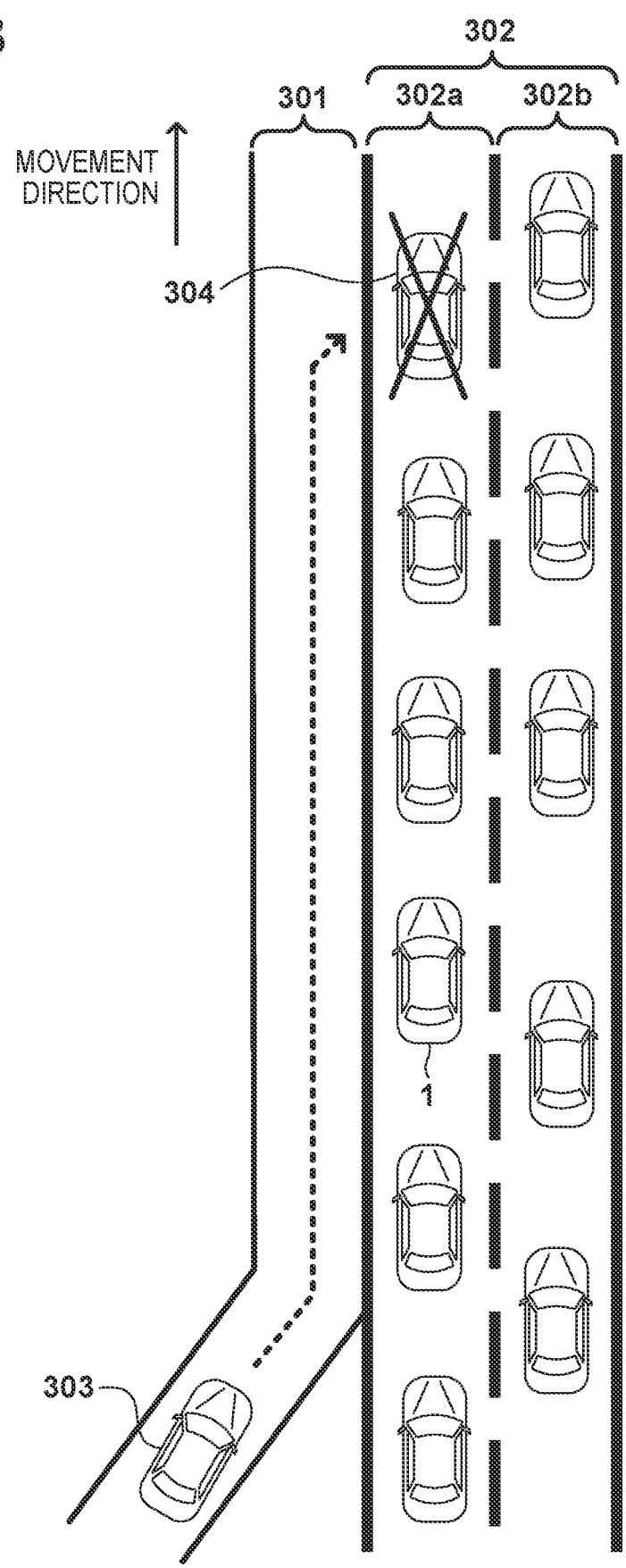
FIG. 3 is a schematic diagram illustrating a state of a vehicle of an embodiment.
Figure 4:
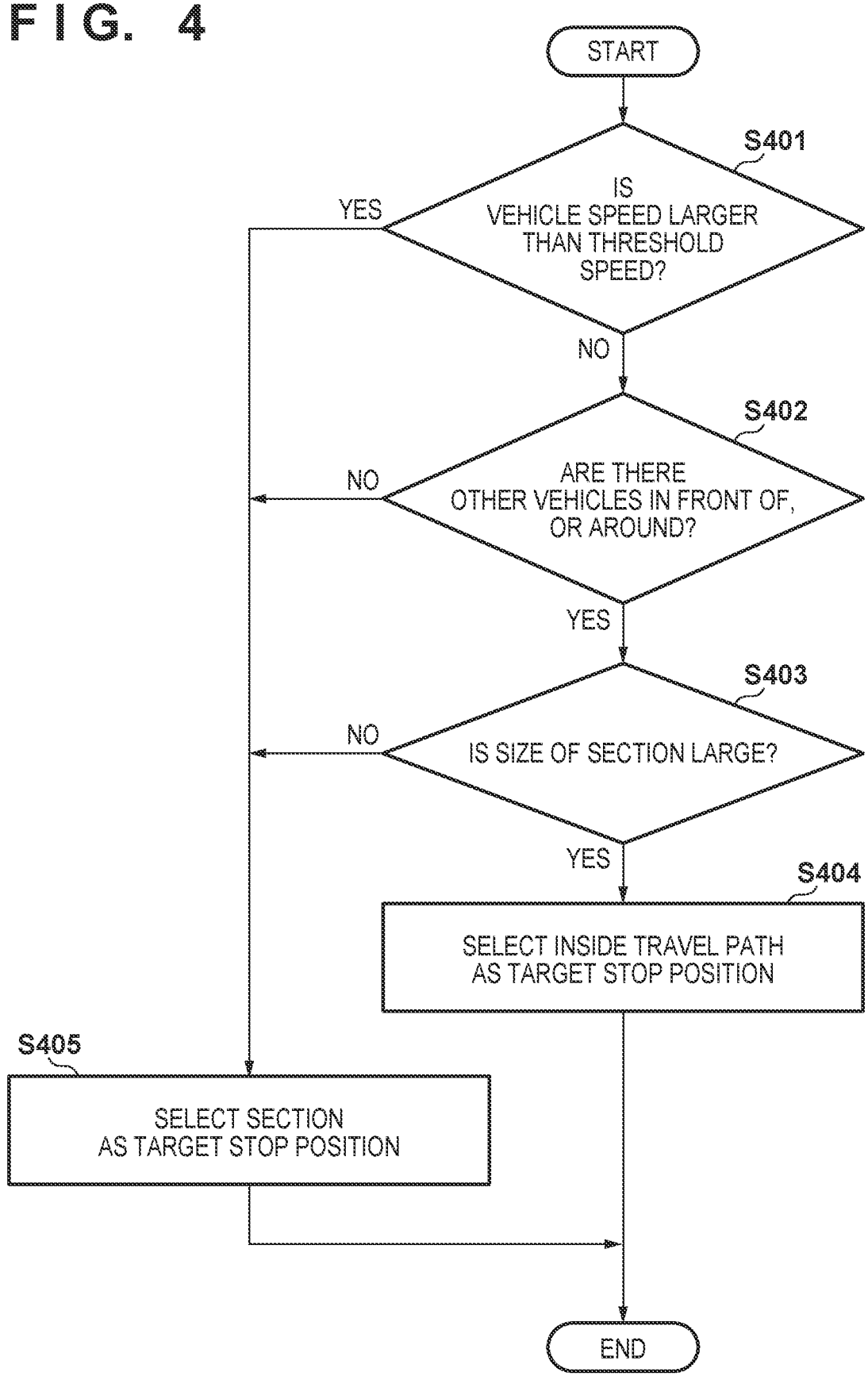
FIG. 4 is a flowchart for realizing an example of processing executed by a control apparatus of an embodiment.

The selection criteria used in step S210 described above will be described with reference to FIGS. 3 to 5. In the description of FIGS. 3 to 5, it is presumed that the vehicle 1 is traveling on a left-hand traffic road. The road on which the vehicle 1 is traveling is constituted by a travel path 302 and a section 301 (e.g., a roadside belt and a road shoulder) that is adjacent to the travel path 302. The travel path 302 is divided into two lanes 302a and 302b.

As shown in FIG. 3, a case where the travel path 302 is congested will be considered. Such congestion occurs in a case where a vehicle 304 located in front of the vehicle 1 has caused an accident, for example. In this case, it is conceivable that an emergency vehicle 303 (a police vehicle or an ambulance) travels in the section 301 toward the vehicle 304. In this case, if the vehicle 1 stops in the section 301, the traveling of the emergency vehicle 303 is blocked. Also, there are cases where a motorcycle may pass through from behind the vehicle 1 during congestion. Because the distance between the vehicle 1 and a vehicle following behind the vehicle 1 is short, the sensors provided in the vehicle 1 have many blind spots, and thus there is a possibility that the approach of such a motorcycle cannot be detected sufficiently. In view of this, the ECU 20 selects the travel path 302 as the target stop position. The ECU 20 reduces the influence on the flow of traffic of the other vehicles by selecting the section 301 as the target stop position in a case where such a circumstance does not arise. In order to move the vehicle 1 to the section 301, the ECU 20 may change lanes in the travel path 302. Stopping the vehicle 1 in the section 301 includes a case where the entire vehicle 1 is located in the section 301, and a case where only a portion of the vehicle 1 is located in the section 301 and the other portion thereof is located on the travel path 302. Stopping the vehicle 1 on the travel path 302 indicates stopping the vehicle 1 on the travel path 302 such that the vehicle 1 does not protrude into the section 301. The ECU 20 selects a target stop position in a latitudinal direction with respect to the moving direction of the vehicle 1 according to selection criteria.

One example of the selection criteria used in step S210 will be described with reference to FIG. 4. In this example, the selection criteria include determination steps S401 to S403 of the flowchart. In step S401, the ECU 20 compares the speed of the vehicle 1 to a threshold speed. The threshold speed serves as a criterion for determining whether the vehicle 1 is staying in the congested travel path, and may be 20 kilometers per hour, for example. The speed of the vehicle 1 may be the speed when step S401 is executed, the speed when, in step S202, it is determined that the predetermined condition is satisfied, or the speed when automated driving is started in the stopping mode in step S209. In a case where the speed of the vehicle 1 is larger than the threshold speed ("YES" in step S401), the ECU 20 advances processing to step S405. In this case, the ECU 20 determines that there is no congestion, and selects the section 301 as the stop position.

In a case where the speed of the vehicle 1 is less than or equal to the threshold speed ("NO" in step S401), the ECU 20 advances processing to step S402. In step S402, the ECU 20 determines whether or not there are other vehicles in a surrounding region of (e.g., in front of, or around) the vehicle 1. The other vehicles are also referred to as surrounding vehicles. This determination is made by determining at least one of a positional relationship with the surrounding vehicles, for example, the present of a preceding vehicle within a threshold distance (e.g., 20 m) from the vehicle 1, and/or the presence of another vehicle around a side of the vehicle 1 (e.g., in an adjacent lane), for example. In a case where no other vehicles are present in front of, or around, the vehicle 1 ("NO" in step S402), the ECU 20 advances processing to step S405. In this case, the ECU 20 determines that there is no congestion, and selects the section 301 as the stop position.

In a case where other vehicles are present in front of, or around, the vehicle 1 ("YES" in step S402), the ECU 20 advances processing to step S403. In step S403, the ECU 20 determines the size of the section 301. This determination is made by determining whether the width of the section 301 is smaller than a threshold width (e.g., a value that is equal to the vehicle width), or whether the length of the section 301 is smaller than a threshold length (e.g., 50 m), for example. The width of the section 301 refers to the length of the section 301 in a direction orthogonal to the direction in which the vehicle 1 moves. The length of the section 301 refers to the length of the section 301 in the moving direction of the vehicle 1. In a case where the section 301 is small ("NO" in step S403), the ECU 20 advances processing to step S405. In this case, the ECU 20 determines that the emergency vehicle 303 is unlikely to travel in the section 301, and selects the section 301 as the stop position.

In a case where the section 301 is large ("YES" in step S403), the ECU 20 advances processing to step S404. In this case, the ECU 20 determines that there is a high risk of moving to the section 301, and selects the travel path 302 as the stop position. In a case of selecting the travel path 302 as the stop position, the ECU 20 may select, as the target stop position, a position that is offset from a preceding vehicle and a rear vehicle of the vehicle 1, or the center position of a travel lane (a lane 302a) of the vehicle 1. Instead of this, the ECU 20 may select, as the target stop position, a position that does not overlap the preceding vehicle or the rear vehicle of the vehicle 1. In a case where a preceding vehicle is traveling along the center of a lane, the ECU 20 preferentially selects the left side of this lane as the target stop position, for example. Also, in a case where the vehicle 1 and a preceding vehicle are traveling in the rightmost lane (e.g., a passing lane) out of a plurality of lanes, the ECU 20 may give priority, as the target stop position, to the right side of this lane (that is, the side close to a median strip). This reduces the influence on the flow of traffic of other vehicles on the travel path 302.

Another example of the selection criteria used in step S210 will be described with reference to FIG. 5. In this example, the selection criteria include determination steps S501 and S502 of the flowchart. In this example, it is presumed that the vehicle 1 has the function of detecting the approach of the emergency vehicle 303 through inter-vehicle communication or the like.

In step S501, the ECU 20 determines whether or not other vehicles are present in front of, or around, the vehicle 1. Step S501 is the same as step S402, In a case where no other vehicles are present in front of, or around, the vehicle 1 ("NO" in step S501), the ECU 20 advances processing to step S504. In this case, the ECU 20 determines that there is no congestion, and selects the section 301 as the stop position. If there is no congestion, the emergency vehicle 303 can also travel on the travel path 302, and thus even if the vehicle 1 stops in the section 301, the emergency vehicle 303 is not prevented from traveling.

In a case where other vehicles are present in front of, or around, the vehicle 1 ("YES" in step S501), the ECU 20 advances processing to step S502. In step S502, the ECU 20 determines whether or not the emergency vehicle 303 is detected behind the vehicle 1. In a case where the emergency vehicle 303 is not detected ("NO" in step S502), the ECU 20 advances processing to step S504. In this case, the ECU 20 determines that the emergency vehicle 303 is unlikely to travel in the section 301, and selects the section 301 as the stop position.

In a case where the emergency vehicle 303 is detected ("YES" in step S502), the ECU 20 advances processing to step S503. In this case, the ECU 20 determines that there is a high risk of moving to the section 301, and selects the travel path 302 as the stop position. In a case of selecting the travel path 302 as the stop position, the ECU 20 may select, as the target stop position, a position that is offset from a preceding vehicle and a rear vehicle of the vehicle 1, or the center position of the travel lane (the lane 302a) of the vehicle 1. This reduces the influence on the flow of traffic of other vehicles on the travel path 302.

Although control for automating all of driving, braking, and steering has been described as automated driving control executed by the ECU 20 in an automated driving mode in the above-described embodiment, the automated driving control need only to control at least one of driving, braking, and/or steering, independent of a driving operation of the driver. Performing control independent of a driving operation of the driver may include performing control without a driver's input to an operator represented by a steering wheel or a pedal, or it can be said that the intention of the driver to drive a vehicle is not required. Thus, the automated driving control encompasses a state in which the driver is obliged to monitor the surroundings and at least one of driving, braking and/or steering of the vehicle 1 is controlled according to information regarding the surrounding environment of the vehicle 1, a state in which the driver is obliged to monitor the surroundings and steering and at least one of driving anchor braking of the vehicle 1 is controlled according to information regarding the surrounding environment of the vehicle 1, and a state in which the driver is not obliged to monitor the surroundings and all of driving, braking and steering of the vehicle 1 are controlled according to information regarding the surrounding environment of the vehicle 1. Also, the automated driving control may enable transition to each of these control stages. Also, a configuration may be adopted in which a sensor for detecting information regarding the state of the driver (biological information such as the heart rate, information such as facial expressions and pupil conditions) is provided, and automated driving control is executed or inhibited according to the detection results of this sensor.

SUMMARY OF EMBODIMENTS

<Configuration 1>

A control apparatus for performing travel control of a vehicle (1), the control apparatus including:
  a sensor (41 to 43) configured to detect a state around the vehicle; and
  a travel controller (20) configured to perform travel control for automated driving based on a detection result of the sensor,
  in which the travel controller is configured to, in a case where a predetermined condition is satisfied, select a target stop position located in a latitudinal direction with respect to a direction in which the vehicle moves, according to selection criteria, and to stop the vehicle at the target stop position, and
  the selection criteria include at least one of
    a comparison between a speed of the vehicle and a threshold speed, and/or
    the presence of a surrounding vehicle of the vehicle, or a positional relationship between the vehicle and a surrounding vehicle of the vehicle.

According to this configuration, it is possible to stop the vehicle at an appropriate position.

<Configuration 2>

The control apparatus according to Configuration 1, wherein
  in a case where the speed is higher than the threshold speed, the control apparatus selects, as the target stop position, a section (301) that is adjacent to a travel path (302) on which the vehicle is traveling.

According to this configuration, it is possible to move the vehicle to the section at low risk.

<Configuration 3>

The control apparatus according to Configuration 1 or 2, wherein
  the selection criteria further include at least one of the presence of a preceding vehicle within a threshold distance from the vehicle, and/or the presence of another vehicle around a side of the vehicle, and
  in a case where no preceding vehicle is present within the threshold distance from the vehicle or no other vehicle is present around a side of the vehicle, the control apparatus selects, as the target stop position, a section that is adjacent to a travel path on which the vehicle is traveling.

According to this configuration, it is possible to detect congestion.

<Configuration 4>

The control apparatus according to any one of Configurations 1 to 3, wherein
  the selection criteria further include a size of a section that is adjacent to a travel path on which the vehicle is traveling, and
  in a case where a width of the section is smaller than a threshold width or a length of the section is smaller than a threshold length, the control apparatus selects the section as the target stop position.

According to this configuration, it is possible to determine the likelihood that an emergency vehicle travels in the section.

<Configuration 5>

The control apparatus according to any one of Configurations 1 to 4, wherein
  in a case where the control apparatus does not select, as the target stop position, a section that is adjacent to a travel path on which the vehicle is traveling, the control apparatus selects the travel path as the target stop position.

According to this configuration, it is possible to reduce the risk of moving to the section.

<Configuration 6>

The control apparatus according to Configuration 5, wherein
  in a case where the control apparatus selects the travel path as the target stop position, the control apparatus selects, as the target stop position, a position that does not overlap a preceding vehicle or a rear vehicle of the vehicle, or a position that is offset from a center position of a travel lane.

According to this configuration, it is possible to reduce the influence on the flow of traffic of other vehicles.

<Configuration 7>

A control apparatus for performing travel control of a vehicle (1), the control apparatus including:
  a sensor (41 to 43) configured to detect a state around the vehicle; and
  a travel controller (20) configured to perform travel control for automated driving based on a detection result of the sensor,
  in which the travel controller is configured to
    in a case where a predetermined condition is satisfied, select a target stop position located in a latitudinal direction with respect to a direction in which the vehicle moves, according to selection criteria, and to stop the vehicle at the target stop position, and
  the selection criteria include detection of an emergency vehicle (303) behind the vehicle.

According to this configuration, a vehicle can stop at an appropriate position.

<Configuration 8>

The control apparatus according to Configuration 7, wherein
  in a case where no emergency vehicle is detected behind the vehicle, the control apparatus selects, as the target stop position, a section that is adjacent to a travel path on which the vehicle is traveling.

According to this configuration, it is possible to move the vehicle to the section at low risk.

<Configuration 9>

The control apparatus according to Configuration 7 or 8, wherein
  the selection criteria further include at least one of the presence of a preceding vehicle within a threshold distance from the vehicle, and/or the presence of another vehicle around a side of the vehicle, and
  in a case where a preceding vehicle is present within the threshold distance from the vehicle or the other vehicle is present around the side of the vehicle, and an emergency vehicle is detected behind the vehicle, the control apparatus selects, as the target stop position, a travel path on which the vehicle is traveling.

According to this configuration, it is possible to select the target stop position according to the approach of an emergency vehicle.

<Configuration 10>

A vehicle, including:

the control apparatus according to any one of Configurations 1 to 9; and an actuator group controlled by the travel controller of the control apparatus.

According to this configuration, a vehicle can stop at an appropriate position.

<Configuration 11>

A method for controlling a vehicle that includes a sensor (41 to 43) configured to detect a state around the self-vehicle (1) and to perform travel control for automated driving based on a detection result of the sensor, the method including a step of, in a case where a predetermined condition is satisfied, selecting a target stop position located in a latitudinal direction with respect to a direction in which the vehicle moves, according to selection criteria, and stopping the vehicle at the target stop position, in which the selection criteria include at least any of a comparison between a speed of the vehicle and a threshold speed, the presence of a surrounding vehicle of the vehicle, or a positional relationship between the vehicle and a surrounding vehicle of the vehicle, and/or detection of an emergency vehicle (303) behind the vehicle.

According to this configuration, it is possible to stop the vehicle at an appropriate position.

The present invention is not limited to the above embodiments and various changes and modifications can be made within the spirit and scope of the present invention. Therefore, to apprise the public of the scope of the present invention, the following claims are made.

What is claimed is:

1. A control apparatus for performing travel control of a vehicle, the control apparatus comprising:

a sensor configured to detect a state around the vehicle; and a travel controller configured to perform travel control for automated driving based on a detection result of the sensor, wherein the travel controller is configured to in a case where a predetermined condition is satisfied, select a target stop position located in a latitudinal direction with respect to a direction in which the vehicle moves, according to selection criteria, and to stop the vehicle at the target stop position, and the target stop position is in accordance with the selection criteria including detection of an emergency vehicle behind the vehicle, and wherein the selection criteria further include at least one of the presence of a preceding vehicle within a threshold distance from the vehicle, and/or the presence of another vehicle around a side of the vehicle, and in a case where a preceding vehicle is present within the threshold distance from the vehicle or the other vehicle is present around the side of the vehicle, and an emergency vehicle is detected behind the vehicle, the control apparatus selects, as the target stop position, a travel path on which the vehicle is traveling.

2. The control apparatus according to claim 1, wherein in a case where no emergency vehicle is detected behind the vehicle, the control apparatus selects, as the target stop position, a section that is adjacent to a travel path on which the vehicle is traveling.

3. The control apparatus according to claim 1, wherein the selection criteria further includes at least one of a comparison between a speed of the vehicle and a threshold speed, and/or the presence of a surrounding vehicle of the vehicle, or a positional relationship between the vehicle and a surrounding vehicle of the vehicle.

4. The control apparatus according to claim 3, wherein in a case where the speed is higher than the threshold speed, the control apparatus selects, as the target stop position, a section that is adjacent to a travel path on which the vehicle is traveling.

5. The control apparatus according to claim 3, wherein the selection criteria further include at least one of the presence of a preceding vehicle within a threshold distance from the vehicle, and/or the presence of another vehicle around a side of the vehicle, and in a case where no preceding vehicle is present within the threshold distance from the vehicle or no other vehicle is present around a side of the vehicle, the control apparatus selects, as the target stop position, a section that is adjacent to a travel path on which the vehicle is traveling.

6. The control apparatus according to claim 3, wherein the selection criteria further include a size of a section that is adjacent to a travel path on which the vehicle is traveling, and in a case where a width of the section is smaller than a threshold width or a length of the section is smaller than a threshold length, the control apparatus selects the section as the target stop position.

7. The control apparatus according to claim 3, wherein in a case where the control apparatus does not select, as the target stop position, a section that is adjacent to a travel path on which the vehicle is traveling, the control apparatus selects the travel path as the target stop position.

8. The control apparatus according to claim 7, wherein in a case where the control apparatus selects the travel path as the target stop position, the control apparatus selects, as the target stop position, a position that does not overlap a preceding vehicle or a rear vehicle of the vehicle, or a position that is offset from a center position of a travel lane.

9. A vehicle, comprising:

the control apparatus according to claim 1; and an actuator group controlled by the travel controller of the control apparatus.

10. The control apparatus according to claim 3, wherein the target stop position is in accordance with the selection criteria including a comparison between a speed of the vehicle and a threshold speed.

11. The control apparatus according to claim 3, wherein the target stop position is in accordance with the selection criteria including the presence of a surrounding vehicle of the vehicle, or a positional relationship between the vehicle and a surrounding vehicle of the vehicle.

12. The control apparatus according to claim 3, wherein the target stop position is in accordance with the selection criteria including both of a comparison between a speed of the vehicle and a threshold speed, and/or the presence of a surrounding vehicle of the vehicle, or a positional relationship between the vehicle and a surrounding vehicle of the vehicle.

13. The control apparatus according to claim 3, wherein selecting the target stop position includes determining whether to move the vehicle to a section that is adjacent to a travel path on which the vehicle is traveling or to stay the vehicle on the travel path on which the vehicle is traveling a driving lane.

14. The control apparatus according to claim 1, wherein selecting the target stop position includes determining whether to move the vehicle to a section that is adjacent to a travel path on which the vehicle is traveling or to stay the vehicle on the travel path on which the vehicle is traveling a driving lane.

15. A method for controlling a vehicle that includes a sensor configured to detect a state around the self-vehicle and to perform travel control for automated driving based on a detection result of the sensor, the method comprising
a step of, in a case where a predetermined condition is satisfied, selecting a target stop position located in a latitudinal direction with respect to a direction in which the vehicle moves, according to selection criteria, and stopping the vehicle at the target stop position,
wherein the target stop position is in accordance with the selection criteria including at least any of
a comparison between a speed of the vehicle and a threshold speed,
the presence of a surrounding vehicle of the vehicle, or a positional relationship between the vehicle and a surrounding vehicle of the vehicle, and/or
detection of an emergency vehicle behind the vehicle, and
wherein the selection criteria further include at least one of the presence of a preceding vehicle within a threshold distance from the vehicle, and/or the presence of another vehicle around a side of the vehicle, and
in a case where a preceding vehicle is present within the threshold distance from the vehicle or the other vehicle is present around the side of the vehicle, and an emergency vehicle is detected behind the vehicle, a travel path on which the vehicle is traveling is selected as the target stop position.

* * * * *